3,000,741
PREPARATION OF SILVER HALIDE EMULSIONS

Alfons Jozef De Pauw and René Maurice Hart, Wilrijk-Antwerp, Belgium, assignors to Gevaert Photo-Producten N.V., Mortsel, Belgium, a Belgian company
No Drawing. Filed May 27, 1959, Ser. No. 816,032
Claims priority, application Belgium May 30, 1958
9 Claims. (Cl. 96—114)

The present invention relates to the preparation of photographic silver halide emulsions as well as of photographic material such as paper, plates or films containing such emulsion.

It is generally known that in the preparation of photographic emulsions gelatin on account of its great dispersing power, its good water-permeability and its exceptional property for thermo-reversible gel-formation is used as protective colloid for the silver halide grains. In this way, the silver halide is formed in an aqueous gelatin solution and after the formation of the suspension an additional quantity of gelatin can be added in order to have the suspension solidified, to noodle and to wash.

Since, however, gelatin has many disadvantages, some restrictions are to be considered for its use. Thus gelatin can be affected by animal or vegetable organisms. It is also attacked by insects, particularly in the tropics, and it is likewise exposed to the action of fungi and bacteria, above all in circumstances of great humidity and in a climate which is favorable for the development of such organisms. Another difficulty consists therein that in consequence of its natural origin the properties of the gelatin in most cases change from one supply to the other. Moreover, emulsion layers cast from gelatin become very weak in warm water and thus the treating solutions must necessarily be kept cold; when exposed to dry air these layers become very brittle. Treatment with strong alkaline reagents, such as appears in photographic processing, can decompose the gelatin and modify its properties. Finally, the gelatin possesses also a low melting temperature which necessitates a treatment at room temperature. The bath solutions and the rinsing water must not exceed these rather low temperatures at the risk of strong swelling.

Although it has been repeatedly tried to replace the gelatin by synthetic substances which do not show these disadvantages, use of said synthetic substances, however, has not been made so far for different reasons. Indeed, some of them inhibit the growth of the silver halide grains, so that only emulsions with extremely low sensitivity can be prepared therewith; others are too easily soluble in water and cannot be hardened so that they dissolve during the photographic processing; or their aqueous solutions cannot be converted into thermoreversible gels, so that the removal of the water-soluble salts which are formed as by-products during the formation of the silver halide crystals becomes impossible by application of the methods used in the preparation of silver halide gelatin emulsions, namely by the formation of noodles which afterwards are washed out by dialysis. Still others do not show the suitable physical properties which are required from a photographic layer former, namely clearness, suitable elasticity modulus, sufficient tensile strength and scratching stability etc.

Of all synthetic substances, polyvinyl alcohol is most cited as substitute for gelatin. Polyvinyl alcohol is a white odorless powder which is obtained by saponification of polyvinyl esters such as polyvinyl acetate; films cast from aqueous solutions of polyvinyl alcohol are clearly transparent, very stable and resistant to most organic solvents. Polyvinyl alcohol can easily be worked up, is available in large quantities and is relatively inexpensive. Polyvinyl alcohol also possesses excellent mechanical and physical properties which for the greater part are to be ascribed to the regular distribution of the hydroxyl groups all over the length of the polymer chain.

The use of polyvinyl alcohol, however, involves great disadvantages which quite restrict its application as dispersing and binding agent for photographic emulsions.

A first disadvantage is its inhibiting action onto the growth of the grain so that only emulsions can be prepared with a very low light-sensitivity. It further appears that polyvinyl alcohol cannot be mixed with gelatin so that its use as layer-former and as binding agent for photographic emulsions wherein gelatin is used as dispersing agent is impossible. Moreover, polyvinyl alcohol can scarcely be used as binding agent since it cannot form of itself thermoreversible gels which makes the washing of the emulsions very hard. It is true that experimenters succeeded in preparing thermoreversible gels for polyvinyl alcohol solutions by addition of some products such as borax, mono- and polyphenols, alpha-naphthol, polyhydroxynaphthalenes and their substitution products, and the azodyestuffs made soluble in water, containing amino groups which are preferably substituted in the benzene nucleus on the o-position in respect of the azo group; none of these products, however, can give a satisfying solution for the problem of the thermoreversibility and most of them cause secondary unfavorable photographic phenomena such as formation of fog, lowering of the sensitivity etc. and also turbidity or staining of the layers cast.

Several other synthetic polymers were further tested as dispersing agent for silver halide grains such as polyvinyl pyrrolidone and polyacrylamide. Polyvinyl pyrrolidone, as well as polyvinyl alcohol inhibit the growth of the silver halide crystals so that only emulsions with extremely fine grain can be prepared herewith. Polyacrylamide possesses insufficient protective properties so that the suspensions prepared therein easily precipitate.

One object of our invention consists in providing a method of forming silver halide dispersions which are especially useful for preparing photographic emulsions.

Another object of our invention consists in providing dispersing agents for silver halide which have a high degree of compatibility with the gelatin and with the non-gelatin layer-forming binding agents, which are ordinarily considered as useful for preparing photographic emulsions.

A further object of our invention consists in providing dispersing agents for the preparation of silver halide grains which are formed in a solution of the dispersing agent so that the surplus of inorganic salts which are present may be readily removed therefrom.

A still further object is to provide layer-forming binding agents for preparing photographic emulsions.

Other objects of the present invention will appear from the following description.

Now we have found that mono-esters of polyvinyl alcohol and polybasic organic acids are very good dispersing agents for silver halide grains.

By mono-esters of polybasic organic acids and polyvinyl alcohol are understood the reaction products of polyvinyl alcohol with lower polybasic organic acids or with derivatives thereof, such as anhydrides or lower mono-esters, for instance mono-methyl and mono-ethyl esters, whereby the hydroxyl groups of polyvinyl alcohol are esterified for 0.5 to 15%. For polymers with lower degree of esterification, growth of grain is little or not possible whereas for polymers with higher degree of esterification the protective action is insufficient so that the silver halide precipitates. Polyvinyl alcohols the hydroxyl groups of which are esterified to 8% with these polybasic acids are mainly considered for the present invention.

For preparing these mono-esters of polyvinyl alcohol are used aliphatic dicarboxylic acids such as succinic acid and glutaric acid, hydroxy-substituted aliphatic dicarboxylic acids such as tartaric acid and malic acid, unsaturated dicarboxylic acids such as maleic acid, fumaric acid, glutaconic acid and itaconic acid, aromatic dicarboxylic acids such as phthalic acid and polybasic organic acids such as citric acid. Of these acids only one of the carboxylic groups may react so that the polymers obtained are not branched and thus by the presence of the free carboxyl groups are completely soluble in water.

The polymers according to the present invention are characterized by the presence of the following structural units:

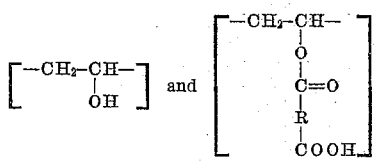

whereby R is a bivalent aliphatic, olefinic or aromatic radical, either substituted or not.

Also mix-esters of polyvinyl alcohol with different polybasic organic acids are considered.

The preparation itself of these monoesters can occur in aqueous medium in the presence of a strong acid catalyst such as hydrochloric acid or sulphuric acid. It can also be executed in a lower fatty acid, for instance acetic acid, as solvent.

The polyvinyl alcohols used in this method can be obtained by complete or partial saponification of polyvinyl esters, for instance polyvinyl acetate, or of copolymers containing vinyl ester groups. Preferably are used polyvinyl alcohols which are soluble in water or in mixtures of alcohol and water. Polyvinyl alcohols the hydroxy groups of which have partially reacted with aldehydes under acetal formation are likewise considered.

Contrary to polyvinyl alcohol silver halide emulsions, sufficiently large silver halide grains can be obtained in diluted aqueous solutions of these mono-esters of polyvinyl alcohol by physical ripening whilst the emulsions formed in this way are very stable.

These mono-esters of polyvinyl alcohol are moreover completely compatible with polyvinyl alcohol so that in the preparation of photographic emulsions whereby mono-esters of polybasic organic acids and polyvinyl alcohol are used as dispersing agents polyvinyl alcohol can here be used without any risk as binding agent/layerformer. Layers cast from this combination are completely homogeneous and clearly transparent. In this way it becomes possible to make the most of the exceptional physical and mechanical properties of polyvinyl alcohol as layer former besides the good protective colloid properties of these mono-esters.

Other polymers, however, can also be used as binding agent on condition that they are compatible with these polyvinyl mono-esters and that they possess good layer-forming properties.

These mono-esters themselves can also be used in this system as binding agent/layer former since they form completely homogenous and clear layers. As the case may be, also gelatin can be used as binding agent/layer former since the latter is likewise well-misicible with these mono-esters.

Whilst the most can be made of the thermoreversibility of gelatin gels for washing out the water-soluble salts from the emulsion, there is for polymers which do not show this particular property still another washing method. Indeed, one succeeded in precipitating silver halide suspensions, prepared in diluted solutions of polymers and in this case of mono-esters of polyvinyl alcohol and polybasic organic acids in such a way that the precipitated grains can easily and thoroughly be washed such as described in the U.S. patent application Serial No. 666,467. For this purpose the suspension is poured out into a coagulating medium such as an organic solvent miscible with water for instance acetone, methanol, ethanol, methylacetate or mixtures thereof, or into a concentrated aqueous solution of an inorganic salt such as sodium sulphate or sodium chloride. The grains thus precipitated which consist of silver halide crystals enveloped by a thin membrane of polymer can now be washed either with mixtures of water and organic solvent the composition of which is chosen in such a way that the polymer does not dissolve but the salts do dissolve, or by alternatively dissolving and precipitating.

After washing, the precipitate is easily taken up in water by slightly heating and afterwards the quantity desired of layer-former is added.

Also according to a dialysis process, the superfluous soluble salts can be caused to diffuse through a semi-permeable membrane from the emulsion to a solution with low salt content which is in connection with this membrane.

In order to allow the processing of these photographic emulsions built with full synthetic and water-soluble polymers, it is necessary to harden the layers. This can be done by addition to the emulsion at any stage whatever of the preparation of suitable compounds such as for instance bifunctional compounds which at room temperature and in dry state react with the hydroxyl groups of polyvinyl alcohol and of polyvinyl alcohol mono-esters and/or with the free carboxyl groups of the polyvinyl mono-esters so that a reticulated polymer structure is formed. For hardening these polyvinyl alcohol emulsions, dimethylol urea is preferably used. If other synthetic polymers are used as binding agent suitable hardening agents must be chosen.

After effectuating the desired grain partition of the silver halide by physical ripening in a diluted solution of these mono-esters and after removing the excess of soluble salts of the emulsion, the light sensitivity of the silver halide crystals can be increased by chemical sensitization. For that purpose, a small quantity of determined sulphur-containing compounds such as allylisothiocyanate, allyl-thiourea, sodium thiosulphate or reduction means such as for instance stannous chloride, hydrazine, water-soluble formaldehyde sulphoxylates or imino-amino-methane-sulphinic acid compounds such as described in the U.S. patent application Serial No. 581,315. Another sensitizing process consists in adding small quantities of metal compounds such as gold, platina, palladium, iridium, ruthenium and rhodium compounds to the emulsion. Evidently, these different sensitizers can be applied either separately or in combination. The addition of the chemical sensitizers can occur at the stage wherein the silver halide is formed as well as during or after the Ostwald-ripening.

In the preparation of emulsions according to the present invention, ingredients such as for instance color couplers, developing substances, fog-inhibiting means, stabilizers, surface active compounds and plasticizers can be added.

The following examples illustrate the invention without limiting, however, the scope thereof in any way. All amounts are given in parts by weight.

*Example 1*

A solution of 6 parts of a monoester of polyvinyl alcohol and maleic acid containing 11.2% of monovinyl maleinate units in 24 parts of water and a solution of 35 parts of ammonium bromide and 0.5 part of potassium iodide in 380 parts of water are thoroughly mixed. To this mixture are added at 55° C. whilst permanently stirring and within a period of 1 min. 50 parts of silver nitrate dissolved in 45 parts of distilled water and 40 parts of concentrated ammonia. When the silver halide grains have reached a diameter of 0.5μ to 1μ (after about 20 minutes) the suspension is poured out into 400 parts of acetone. The suspension settles out under the form of a powdery precipitate. The supernatant transparent liquid is decanted and the precipitated suspension grains are twice washed with a mixture of 200 parts of water and 160 parts of acetone. After the last decantation the precipitate is retaken in 300 parts of water and the pH is brought at 7.00. After bringing the silver halide grains in dispersion by gradually heating, 400 parts of an aqueous polyvinyl alcohol solution 10% are added and afterwards the whole is diluted whilst thoroughly stirring to 1000 parts. The chemical ripening occurs at 45–50° C. with 5 parts of a 0.1% of aqueous sodium thiosulphate solution. The emulsion thus obtained is coated on a paper support. The photographic paper obtained is very sensitive and has a good gradation.

Example 2

As in Example 1 but instead of polyvinyl alcohol as layer former binding agent a mono-ester of polyvinyl alcohol and maleic acid is used. The hardening occurs in this case with aliphatic diamines such as described in the British patent application No. 9,819/59.

Example 3

To a solution of 10 parts of a mono-ester of polyvinyl alcohol and maleic acid with 11.2% of a monovinyl maleinate units in 270 parts of water, are added in a period of 3 min. and at 50° C. the following two solutions:

A. 50 parts of silver nitrate dissolved in 43 parts of distilled water and 41 parts of concentrated ammonia;
B. 43 parts of potassium bromide dissolved in 105 parts of distilled water.

After about 25 min. the grains have reached a diameter of about $0.5\mu$. The suspension is then poured out into 300 parts of acetone and the precipitated grains are washed by successively dispersing twice in 150 parts of water and precipitating into 200 parts of acetone. After the last decantation 200 parts of water are added. The suspension is now swollen at room temperature and heated for 1 hr. at 45° C.; hereby a good dispersion is obtained back. 400 parts of an aqueous polyvinyl alcohol solution 10% are added and the mixture is thoroughly mixed. The whole is diluted to 1000 parts. The emulsion thus obtained is coated on a cellulose triacetate support. The photographic film obtained is very contrasty and rather sensitive.

Example 4

To a solution of 29 parts of potassium bromide, 0.5 part of potassium iodide, 12 parts of ammonium bromide and 10 parts of a mono-ester of phthalic acid and polyvinyl alcohol 3.5% of the hydroxyl groups of which is esterified with phthalic acid in 380 parts of water is added in a period of 2 min. and at temperature of 50° C. a solution of 50 parts of silver nitrate in 41 parts of concentrated ammonia and 43 parts of distilled water. After complete addition the reaction mixture is caused to ripen for 20 min. at 50° C. The silver halide grains have then reached a diameter of 0.3 to $0.5\mu$. The suspension is now poured out into 500 parts of acetone and after decantation the precipitated grains are washed for a couple of times with a mixture consisting of equal parts of acetone and water. After the last decantation, the grains are dispersed again in 500 parts of water at 50° C. and after complete dissolution 350 parts of an aqueous high-molecular polyvinyl alcohol solution 10% are added. The emulsion can now be ripened chemically with a diluted aqueous thiosulphate solution and is coated on a paper support. The photographic paper obtained is very sensitive and has a very good gradation.

Example 5

As in Example 4 but instead of a mono-ester of phthalic acid and polyvinyl alcohol a mono-ester of tartaric acid and polyvinyl alcohol is used, whereby the hydroxyl groups of the latter are esterified for 10.5% with tartaric acid.

Example 6

To a solution of 3 parts of a partial mono-ester of glutaric acid and polyvinyl alcohol, 6% of the hydroxyl groups of which have reacted with glutaric acid in 250 parts of water, are added in a period of 3 min. the following two solutions:

A. 50 parts of silver nitrate dissolved in 30 parts of concentrated ammonia and 55 parts of distilled water.
B. 35 parts of ammonium bromide and 1 part of ammonium iodide dissolved in 108 parts of distilled water.

The temperature of the different solutions amounts to 55° C. After 30 min. physical ripening the suspension grains have reached a diameter of $0.5\mu$. Immediately after the physical ripening the suspension is slowly and whilst thoroughly stirring poured out into 480 parts of acetone. The precipitated suspension grains are twice successively dispersed again in 150 parts of water and precipitated again in 200 parts of acetone. After the last precipitation and decantation the precipitate is dispersed again at 50° C. in a mixture of 350 parts of a high-molecular polyvinyl alcohol solution 20% in water and 550 parts of water. The emulsion is chemically ripened with a diluted aqueous sodium thiosulphate solution and coated on a paper support. The photographic paper obtained is very sensitive and has a very good gradation.

Example 7

As in Example 6 but instead of a mono-ester of glutaric acid and polyvinyl alcohol is used a polyvinyl alcohol 4.5% of the hydroxyl groups of which are esterified with citric acid and wherein only one of the carboxyl groups of citric acid has reacted with the hydroxide groups of polyvinyl alcohol.

Example 8

To a solution of 30 parts of potassium bromide, 0.5 part of potassium iodide, 10 parts of ammonium bromide and 10 parts of a mono-ester of phthalic acid and polyvinyl alcohol, 4.2% of the hydroxyl groups of which is esterified with phthalic acid in 400 parts of water, is added in a period of 3 min. and at 50° C. a solution of 50 parts of silver nitrate in 45 parts of concentrated ammonia and 45 parts of distilled water. After 25 minutes' physical ripening 200 parts of an aqueous ammonium sulphate solution 50% are added to this suspension. A powdery precipitate immediately settles out which after decantation of the supernatant transparent liquid is washed twice with 125 parts of water of 5° C. After the last decantation the precipitate is dispersed again in 400 parts of water at 50° C. and after complete solution 500 parts of an aqueous solution 15% of a mono-ester of phthalic acid and polyvinyl alcohol are added. Chemical ripening likewise occurs with sodium thiosulphate.

Example 9

As in Example 8 but instead of the mono-ester of phthalic acid and polyvinyl alcohol gelatin is used as layer former/binding agent. For this purpose is used 500 parts of an aqueous gelatin solution 15%. The emulsion is not precipitated but after adding gelatin, it is solidified, noodled and washed.

We claim:
1. A method of forming a photographic silver halide emulsion, which comprises mixing together a water-soluble silver salt and a water-soluble inorganic halide in a dilute aqueous solution of a mono-ester resulting from the esterification of polyvinyl alcohol and a member selected from the group consisting of an aliphatic dicarboxylic acid, a hydroxy-substituted aliphatic dicarboxylic acid, an aromatic dicarboxylic acid and a tribasic carboxylic acid, the hydroxyl groups of polyvinyl alcohol being esterified for 0.5% to 15% of the total amount of the hydroxyl groups present, ripening the silver halide dispersion in said aqueous solution, freeing the silver halide dispersion from the water-soluble by-product salts, and adding to the silver halide dispersion a layer-forming binding agent therefor, said layer-forming binding agent being selected from the group consisting of gelatin, polyvinyl alcohol and said mono-ester.

2. A method of forming a photographic silver halide emulsion, which comprises mixing together a water-soluble silver salt and a water-soluble inorganic halide in a dilute aqueous solution of a mono-ester of polyvinyl alcohol and maleic acid, the hydroxyl groups of polyvinyl alcohol being esterified for 11.2% of the total amount of the hydroxyl groups present, ripening the silver halide dispersion in said aqueous solution, freeing the silver halide dispersion from the water-soluble by-product salts, and adding to the silver halide dispersion polyvinyl alcohol as a layer-forming binding agent therefor.

3. A method of forming a photographic silver halide emulsion, which comprises mixing together a water-soluble silver salt and a water-soluble inorganic halide in a dilute aqueous solution of a mono-ester of polyvinyl alcohol and maleic acid, the hydroxyl groups of polyvinyl alcohol being esterified for 11.2% for the total amount of the hydroxyl groups present, ripening the silver halide dispersion in said aqueous solution, freeing the silver halide dispersion from the water-soluble by-product salts, and adding to the silver halide dispersion said mono-ester of polyvinyl alcohol and maleic acid as a layer-forming binding agent therefor.

4. A method of forming a photographic silver halide emulsion, which comprises mixing together a water-soluble silver salt and a water-soluble inorganic halide in a dilute aqueous solution of a mono-ester of polyvinyl alcohol and phthalic acid, the hydroxyl groups of polyvinyl alcohol being esterified for 3.5% of the total amount of the hydroxyl groups present, ripening the silver halide dispersion in said aqueous solution, freeing the silver halide dispersion from the water-soluble by-product salts, and adding to the silver halide dispersion polyvinyl alcohol as a layer-forming binding agent therefor.

5. A method of forming a photographic silver halide emulsion, which comprises mixing together a water-soluble silver salt and a water-soluble inorganic halide in a dilute aqueous solution of a mono-ester of polyvinyl alcohol and tartaric acid, the hydroxyl groups of polyvinyl alcohol being esterified for 10.5% of the total amount of the hydroxyl groups present, ripening the silver halide dispersion in said aqueous solution, freeing the silver halide dispersion from the water-soluble by-product salts, and adding to the silver halide dispersion polyvinyl alcohol as a layer-forming binding agent therefor.

6. A method of forming a photographic silver halide emulsion, which comprises mixing together a water-soluble silver salt and a water-soluble inorganic halide in a dilute aqueous solution of a mono-ester of polyvinyl alcohol and glutaric acid, the hydroxyl groups of polyvinyl alcohol being esterified for 6% of the total amount of the hydroxyl groups present, ripening the silver halide dispersion in said aqueous solution, freeing the silver halide dispersion from the water-soluble by-product salts, and adding to the silver halide dispersion polyvinyl alcohol as a layer-forming binding agent therefor.

7. A method of forming a photographic silver halide emulsion, which comprises mixing together a water-soluble silver salt and a water-soluble inorganic halide in a dilute aqueous solution of a mono-ester of polyvinyl alcohol and citric acid, the hydroxyl groups of polyvinyl alcohol being esterified for 4.5% of the total amount of the hydroxyl groups present, ripening the silver halide dispersion in said aqueous solution, freeing the silver halide dispersion from the water-soluble by-product salts, and adding to the silver halide dispersion polyvinyl alcohol as a layer-forming binding agent therefor.

8. A method of forming a photographic silver halide emulsion, which comprises mixing together a water-soluble silver salt and a water-soluble inorganic halide in a dilute aqueous solution of a mono-ester of polyvinyl alcohol and phthalic acid, the hydroxyl groups of polyvinyl alcohol being esterified for 4.2% of the total amount of the hydroxyl groups present in the polyvinyl alcohol, ripening the silver halide dispersion in said aqueous solution, freeing the silver halide disperson from the water-soluble by-product salts, and adding to the silver halide dispersion said mono-ester of polyvinyl alcohol and phthalic acid as a layer-forming binding agent therefor.

9. A method of forming a photographic silver halide emulsion, which comprises mixing together a water-soluble silver salt and a water-soluble inorganic halide in a dilute aqueous solution of a mono-ester of polyvinyl alcohol and phthalic acid, the hydroxyl groups of polyvinyl alcohol being esterified for 4.2% of the total amount of the hydroxyl groups present, ripening the silver halide dispersion in said aqueous solution, freeing the silver halide diseprsion from the water-soluble by-product salts, and adding to the silver halide dispersion gelatin as a layer-forming binding agent therefor.

References Cited in the file of this patent

UNITED STATES PATENTS

| | | |
|---|---|---|
| 2,218,255 | Weyerts | Oct. 15, 1940 |
| 2,484,415 | Malm | Oct. 11, 1949 |
| 2,759,909 | Hiatt et al. | Aug 21, 1956 |
| 2,796,413 | Boer | June 18, 1957 |
| 2,828,289 | Mench | Mar. 25, 1958 |